US011122029B2

(12) United States Patent
Huang et al.

(10) Patent No.: US 11,122,029 B2
(45) Date of Patent: Sep. 14, 2021

(54) SECURE CLOUD COMPUTING

(71) Applicant: Citrix Systems, Inc., Fort Lauderdale, FL (US)

(72) Inventors: Feng Huang, Girton (GB); Andy Cooper, Royston (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 316 days.

(21) Appl. No.: 16/246,104

(22) Filed: Jan. 11, 2019

(65) Prior Publication Data
US 2020/0228517 A1 Jul. 16, 2020

(51) Int. Cl.
```
G06F 21/62      (2013.01)
G06F 21/45      (2013.01)
H04L 29/06      (2006.01)
G06F 9/455      (2018.01)
H04L 9/32       (2006.01)
G06F 21/71      (2013.01)
```
(52) U.S. Cl.
CPC ...... H04L 63/0807 (2013.01); G06F 9/45558 (2013.01); H04L 9/3247 (2013.01); H04L 63/045 (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 10,282,531 B1 * | 5/2019 | Davey | G06F 21/42 |
| 2005/0239447 A1 * | 10/2005 | Holzman | H04L 63/102 |
| | | | 455/414.3 |
| 2006/0075069 A1 | 4/2006 | Mohan et al. | |
| 2014/0181256 A1 * | 6/2014 | Trifa | H04L 67/327 |
| | | | 709/218 |
| 2014/0195604 A1 | 7/2014 | Wyatt et al. | |
| 2015/0058330 A1 * | 2/2015 | Carroll | H04L 61/3025 |
| | | | 707/723 |
| 2015/0096000 A1 * | 4/2015 | Sharif | G06F 21/31 |
| | | | 726/6 |

(Continued)

FOREIGN PATENT DOCUMENTS

WO 2017/079523 A1 5/2017

OTHER PUBLICATIONS

Apr. 20, 2020—International Search Report and Written Opinion—App PCT/US2020/012441.

(Continued)

*Primary Examiner* — Venkat Perungavoor
(74) *Attorney, Agent, or Firm* — Banner & Witcoff, Ltd.

(57) ABSTRACT

Methods and systems for securely using a web application to invoke an application to complete a task are described herein. The application may use identity information provided by the web application to determine whether to comply with requests from the web application. The web application may send the request to the application via a browser. The request may include the origin of the request in an origin header to prevent malicious websites from spoofing the origin of the request. The application may exchange information with a trust service to determine whether the web application domain is trusted and/or belongs to the same organization of the user.

20 Claims, 9 Drawing Sheets

(56) References Cited

U.S. PATENT DOCUMENTS

| | | | |
|---|---|---|---|
| 2015/0096001 A1* | 4/2015 | Morikuni | H04L 63/08 |
| | | | 726/7 |
| 2015/0172277 A1* | 6/2015 | Hoggan | H04L 9/3263 |
| | | | 726/6 |
| 2015/0350173 A1 | 12/2015 | Tanase | |
| 2017/0195430 A1* | 7/2017 | Ben-Tzur | H04W 4/029 |
| 2018/0077149 A1* | 3/2018 | Rykowski | H04L 9/3268 |
| 2020/0213272 A1* | 7/2020 | Deverakonda Venkata | |
| | | | H04L 63/0823 |

OTHER PUBLICATIONS

"What's to stop malicious code from spoofing the "Origin" header to exploit CORS?", Stack Overflow, downloaded from <https://stackoverflow.com/questions/21058183/whats-to-stop-malicious-code-from-spoofing-the-origin-header-to-exploit-cors> on Dec. 5, 2018.

Barth, A., et al., "The HTTP Origin Header", <https://tools.ietf.org/id/draft-abarth-origin-03.html>, Sep. 2009, 5 pages.

\* cited by examiner

SECURE CLOUD COMPUTING

FIELD

Aspects described herein generally relate to computing, software, and computer networking. More specifically, aspects described herein relate to securely launching remote resources in a cloud computing environment.

BACKGROUND

In some cases, a user may desire to access a remote resource via a client device. To access a remote resource, a web application may invoke a native application that is executing on the client device to complete a task. In some cases, it may be possible for a malicious web application to cause the native application to connect to a malicious server. The malicious server may then be able to send a request to the native application and cause the user to reveal sensitive information (e.g., via spoofed user interface elements), or directly access sensitive data stored on the client device.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, it would be beneficial to have a way to securely access a remote resource and prevent harm from malicious web applications and servers. Aspects described herein are directed towards securely using a web application to invoke an application to complete a task. The application may use identity information provided by the web application to determine whether to comply with requests from the web application. The web application may send the request to the application via a browser. The request may include the origin of the request in an origin header to prevent malicious websites from spoofing the origin of the request. The application may exchange information with a global trust service to determine whether the web application domain is trusted and/or belongs to the same organization of the user. Aspects described herein may prevent untrusted web applications and/or websites from causing the application to disclose sensitive information or connect to malicious servers. Aspects described herein may provide a secure mechanism to invoke a native application from a web browser without the need to install a browser plug-in, protocol handler or other browser extension, in a manner that is compatible with browsers and operating-systems.

In one aspect, a computer implemented method may include sending, by a server, identification information to a web browser executing on a client device, the identification information being associated with the client device; receiving, by the server, a request for valid domain information from a first application executing on the client device, wherein the request comprises the identification information; sending, by the server, the valid domain information to the first application based on a determination that the identification information is valid; and establishing, based on a determination that a domain name associated with the web browser is valid, a connection with a second application executing on a remote device, wherein the determination is made using the valid domain information. The identification information may correspond to a user of the client device.

The method may further include sending, to the first application and based on a request to launch a second application, the valid domain information, wherein the request to launch a second application is received from the web browser.

The method may further include receiving, from the first application, a request to connect to the second application; and establishing a connection between the first application and the second application. The identification information may include an identity ticket and the identity ticket may be linked to a user identification obtained from the web browser. The identification information may correspond to a web browser executing on a client device.

The method may further include signing the identification information with a private key. The determination that the identification information is valid may include validating, using a public key corresponding to the private key, that the identification information is signed by the private key.

The method may further include sending, by a web browser executing on a client device, a first request for local information to a first application executing on the client device. The first request may be sent using Hypertext Transfer Protocol and may include an origin header indicating a domain name corresponding to a source of the first request. The method may further include establishing a connection with a second server based on a determination that the domain name is valid. The determination that the domain name is valid may be based on the valid domain information.

The method may further include sending, by the web browser and to the first server, a request to launch a remote application; and validating, by the first application and based on the valid domain information, the request to launch a remote application.

In other aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards securely using a web application to invoke an application to complete a task. The application may use identity information provided by the web application to determine whether to comply with requests from the web application. The web application may send the request to the application via a browser. The request may include the origin of the request in an origin header to prevent malicious web sites from spoofing the origin of the request. The browser may prevent the web application from changing the origin header of the request allowing the web application to be correctly identified by the application. The application may exchange information with a global trust service to determine whether the web application domain is trusted and/or belongs to the same organization of the user. The application may determine whether to comply with connection requests or information requests from the web application based on whether the web application domain is trusted. Aspects described herein may prevent untrusted web applications and/or websites from causing the application to disclose sensitive information or connect to malicious servers. Aspects described herein may provide other technology improvements or advantages, such as a secure mechanism to invoke a native application from a web browser without the need to install a browser plug-in, protocol handler or other browser extension, in a manner that is compatible with browsers and operating-systems.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
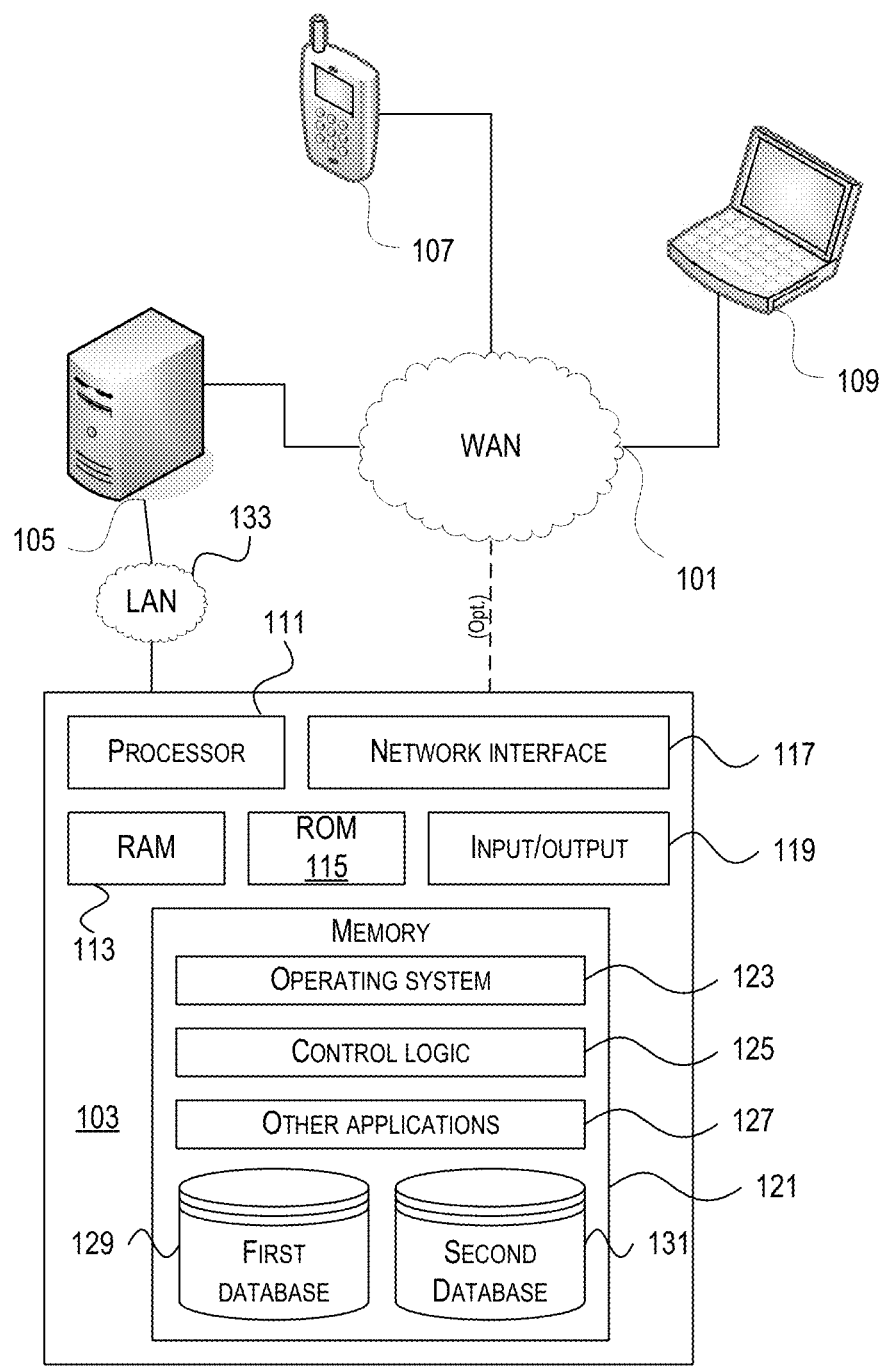
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data attributable to a single entity which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
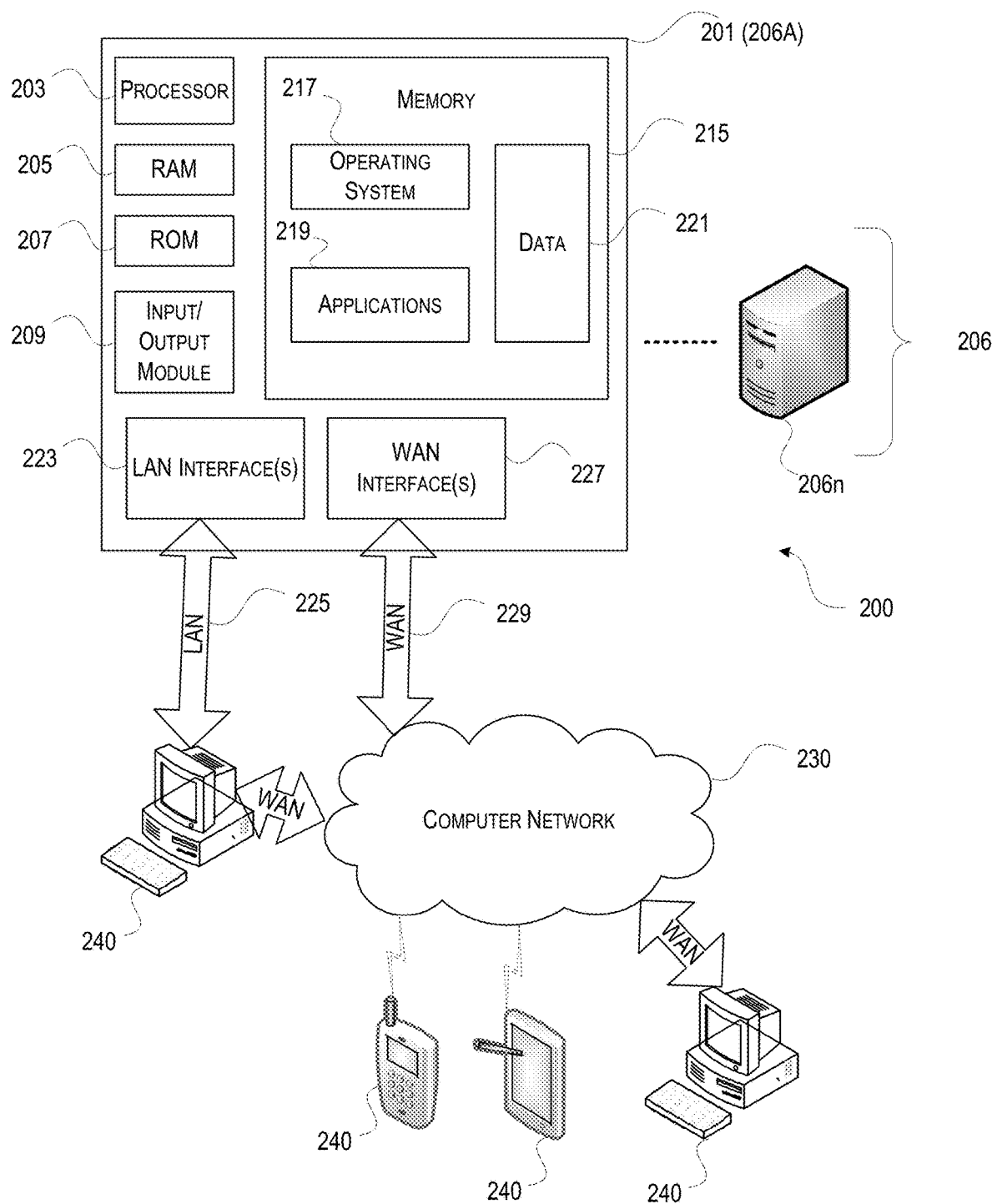
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
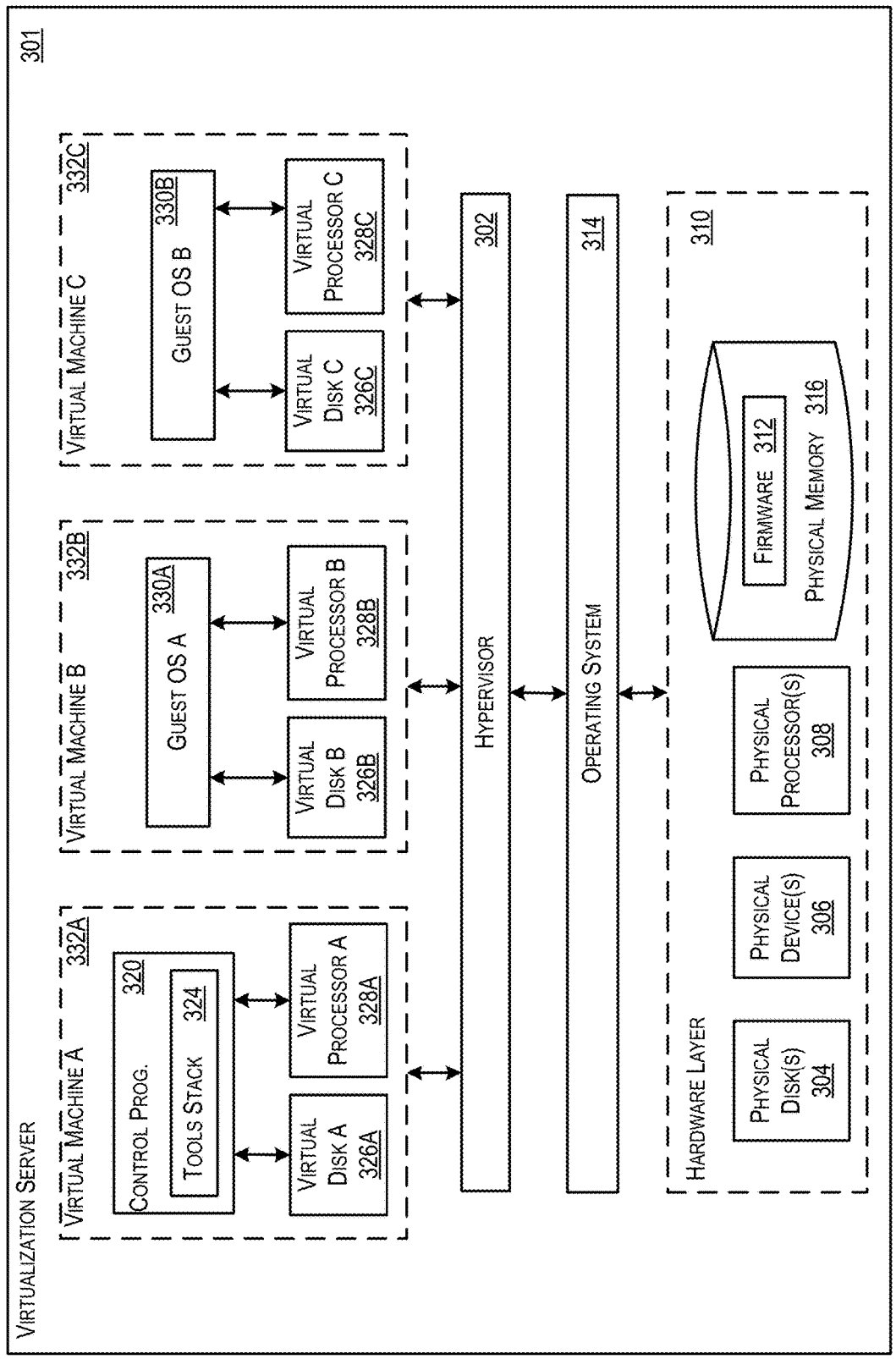
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
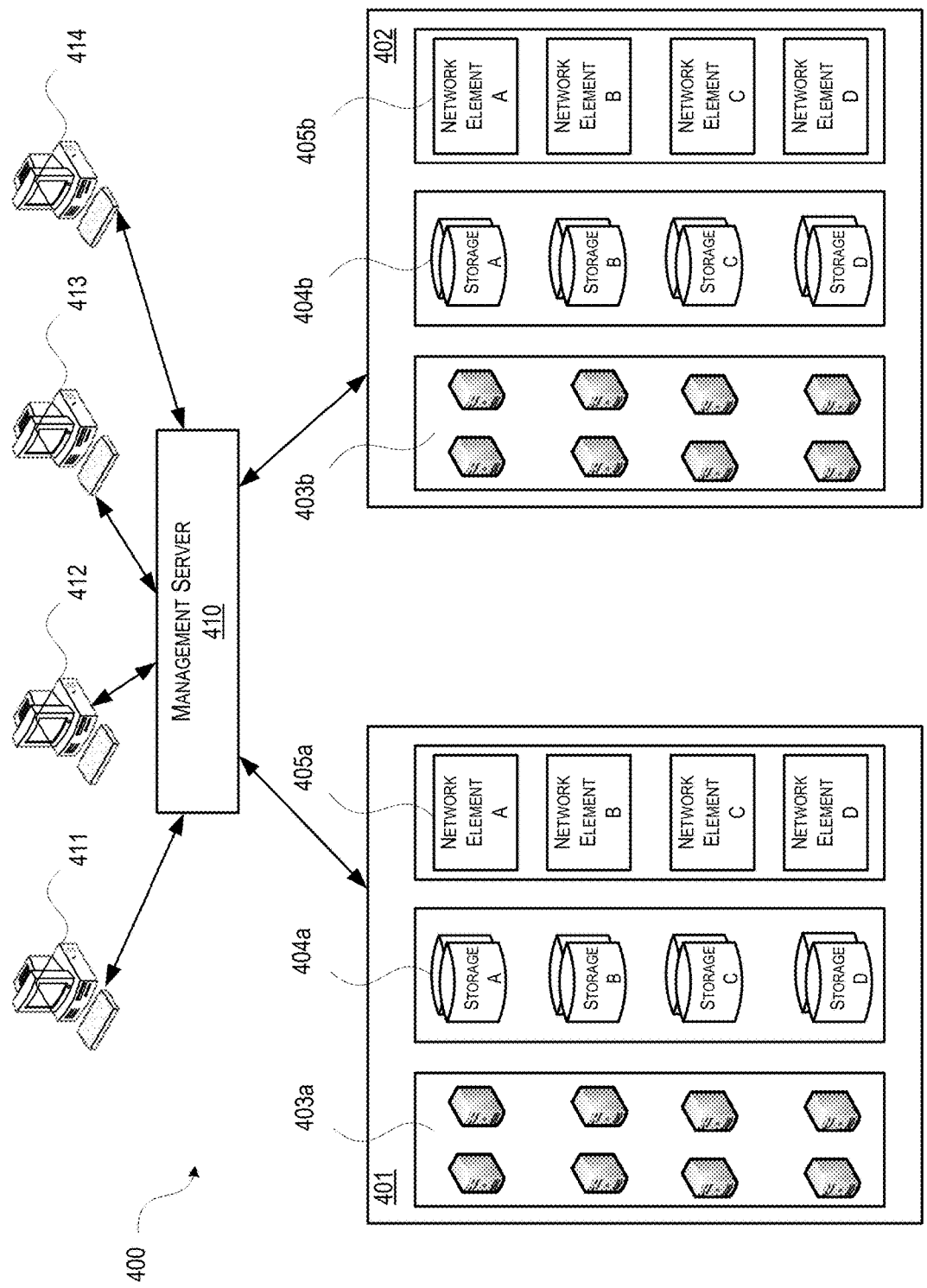
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Rovius Cloud, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Secure Cloud Computing

Figure 5:
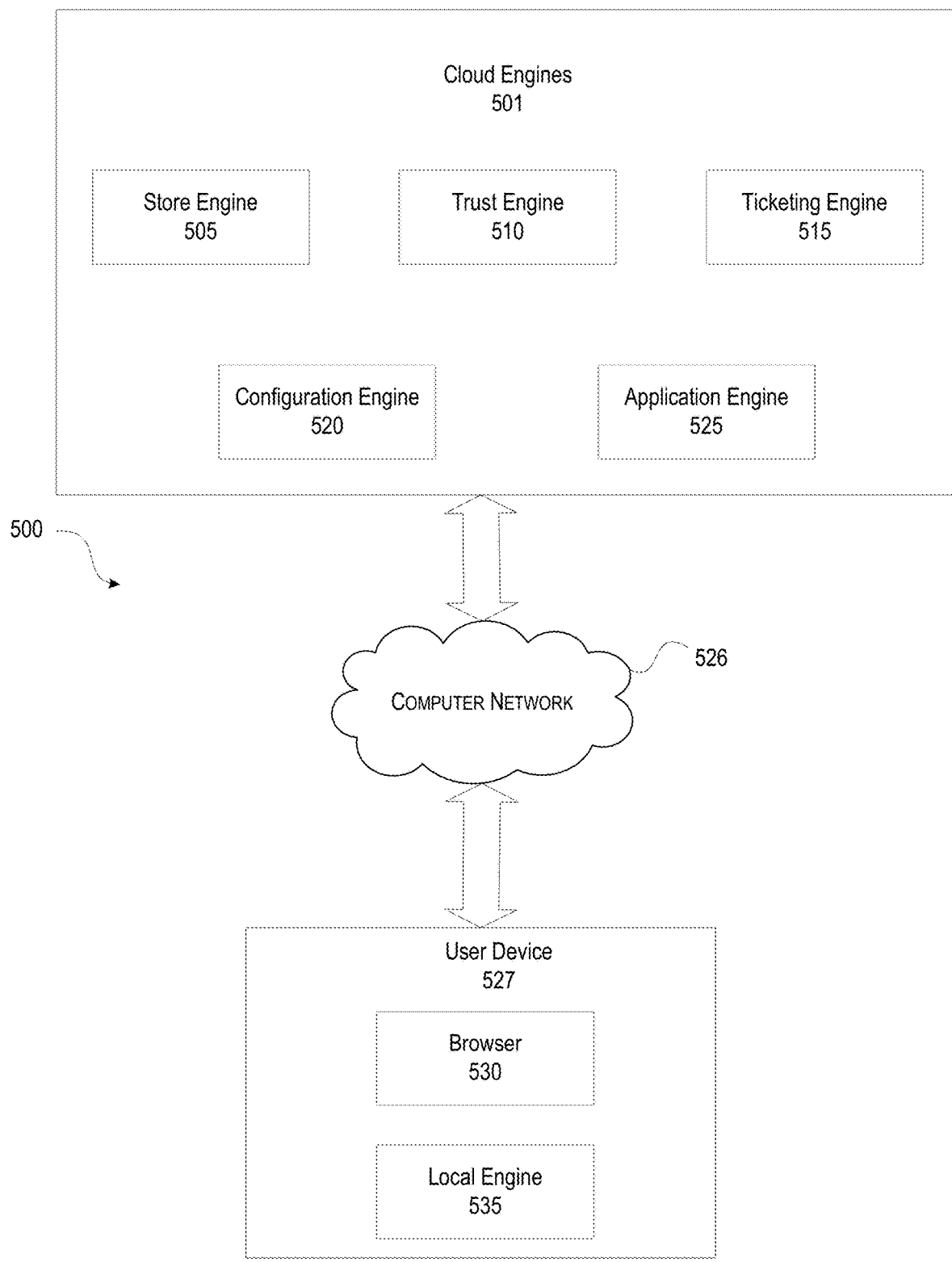
FIG. 5 depicts an illustrative secure cloud system that may be used in accordance with one or more illustrative aspects described herein.

FIG. 5 shows an example secure cloud system 500. Any component within secure cloud system 500 may include any component from FIGS. 1-4. Secure cloud system 500 may contain one or more computing devices. For example, secure cloud system 500 may contain one or more cloud engines 501. Cloud engines 501 may be contained in one or more servers and may be configured to communicate with client devices. Cloud engines 501 may include store engine 505, trust engine 510, ticketing engine 515, configuration engine 520, and application engine 525. Cloud engines 501 may be implemented on hardware and/or software on one or more devices (e.g., servers or other computing devices). Each engine within cloud engines 501 may be a separate device. For example each engine within cloud engines 501 may be a separate server. Alternatively one or more engines within cloud engine 501 may be combined into one or more devices. For example, store engine 505, trust engine 510, ticketing engine 515, and configuration engine 520 may be contained in one server, while application engine 525 may be contained in a separate server. Secure cloud system 500 may include user device 527. User device 527 may include browser 530 and/or local engine 535. User device 527 may include any component described above with respect to FIGS. 1-4.

Store engine 505 may include any component or functionality as described with cloud management server 410 and/or servers 206. Store engine 505 may be configured to generate, host, transmit, and/or otherwise provide information for one or more web pages and/or other graphical user interfaces (which may, e.g., cause one or more other computer systems such as user device 527 to display and/or otherwise present the one or more web pages and/or other graphical user interfaces). In some instances, the web pages, information, and/or other graphical user interfaces generated by store engine 505 may be associated with an external portal, web page, or application provided by an organization. The web pages, information, and/or other graphical user interfaces may allow a user device to login to the store engine 505 and view details related to remote resources (e.g., virtual applications, desktops, etc.) that are available to the user.

Store engine 505 may have a public/private key pair that can be used to sign and validate identity information corresponding to a user or user device that has logged into store engine 505. The public/private key pair may be any type of asymmetric key generated using any type of algorithm for asymmetric cryptography (e.g., RSA, elliptic curve cryptography, etc.). The identity information may be any information used to identify a user or user device. The identity information may be an identity ticket. The identity ticket may be a one-time use ticket. The identity information may be a cookie. The identity information or identity ticket may identify the user, user device 527, an organization that the user belongs to, a group of users, and/or browser 530. The identity information may be generated based on a client identifier received from store engine 505. As illustrated in more detail below, store engine 505 may generate launch data that can be used by user device 527 to launch a remote resource.

Trust engine 510 may include any component or functionality as described with cloud management server 410 and/or servers 206. Trust engine 510 may be configured to validate identity information. For example, trust engine 510 may validate identity information that has been signed by store engine 505. The identity information may be validated using the public key of store engine 505. For example, using the public key, trust engine 510 may determine whether the identity information was signed using the private key of store engine 505. As illustrated in greater detail below, trust engine 510 may be configured to obtain domain information corresponding to a user and/or user device 527.

Ticketing engine 515 may include any component or functionality as described with cloud management server 410 and/or servers 206. Ticketing engine 515 may be configured to generate identity information (e.g., an identity ticket) for user device 527. The identity information may be generated based on login information that is sent by user device 527 and received by store engine 505. Additionally/alternatively the identity information may be generated based on a user profile of a person using user device 527. The user profile may contain information such as contact information, address, user preferences etc. Configuration engine 520 may be configured to generate domain information as described in greater detail below. Domain information may one or more domain names where each domain name may identify one or more Internet Protocol addresses.

Application engine 525 may include any component or functionality as described with virtualization server 301, host servers 403a-403b, and/or servers 206. Application engine 525 may be configured to provide remote resources such as virtual applications, desktops, or other virtual machines, as described in FIGS. 3-4 above, accessible by the user device 527. As illustrated in further detail below, application engine 525 may provide remote resources to user device 527 via a connection with local engine 535.

User device 527 may include any component or functionality as described with computing device 201, client devices 240, and/or client computers 411-414. User device 527 may be a smartphone, personal digital assistant, voice recognition assistant, laptop computer, tablet computer, desktop computer, smart home device, listening device, infotainment head unit of a vehicle, or the like configured to perform one or more functions described herein. User device 527, browser 530, and/or local engine 535 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages, information, and/or other graphical user interfaces generated by user device 527 may allow for use of a remote resource provided by application engine 525. Although only client device 527 is depicted in FIG. 5, any number of client devices may be used in secure cloud system 500.

Browser 530 may be any kind of browser that can be used to access web pages or other content on the Internet (e.g., Firefox, Chrome, Netscape, Opera, Safari, Konqueror, Edge, etc.). Browser 530 may use an origin header in requests that are sent to local engine 535. The requests may be made to send information to browser 530 or to launch a remote resource. The origin header may indicate what caused browser 530 to initiate a request. For example, the origin header may contain a domain name of a web application that is causing browser 530 to make the request. Browser 530 may prevent the origin header from being modified. For example, the browser 530 may generate the request that contains the origin header and may prevent the origin header from being modified.

Local engine 535 may be configured to connect to application engine 525 to provide remote resources on user device 527. For example, browser 530 and local engine 535 may communicate using HTTP and/or HTTPS. As described in greater detail below, local engine 535 may communicate with browser 530. Local engine 535 may have a certificate that is digitally signed by the installer of local engine 535. The certificate may be installed in a trusted certificate store of user device 527. The certificate may be used for HTTPS communication between local engine 535 and browser 530. Local engine 535 may store a uniform resource locator (URL) corresponding to trust engine 510. The URL may specify the location of trust engine 510 on a computer network. Local engine 535 may be configured to verify launch requests and requests for local information with trust engine 510 or other engines within cloud engines 501. As described in more detail below, local information may include any information about software or hardware contained in user device 527. As described in more detail below, local engine 535 may use valid or trusted domain information obtained from trust engine 510 to verify that the requests are from a valid or trusted source.

Cloud engines 501 and user device 527 may connect to each other via computer network 526. Computer network 526 may include any component or functionality described with computer network 230.

In some aspects, user device 527 may receive valid domain information without using trust engine 510. For example, in an on-premises deployment, user device 527 may receive valid domain information from a local administrator. As described in more detail below, valid domain information may include domain names that are trusted by a user, user device 527, or an organization that the user or user device 527 belong to. Valid domain information may include other information relevant to validating a request for local information. In an on-premises deployment, local engine 535 may validate requests from browser 530 without connecting to trust engine 510. The valid domain information may be stored in local storage on user device 527 and the local engine 535 may access the valid domain information from the local storage. If no valid domain information can be found, user device 527 may prompt a user for consent when an attempt is made to contact a domain. The consent prompt may allow the local engine 530 to determine whether a launch request was made by the user.

Figure 6:
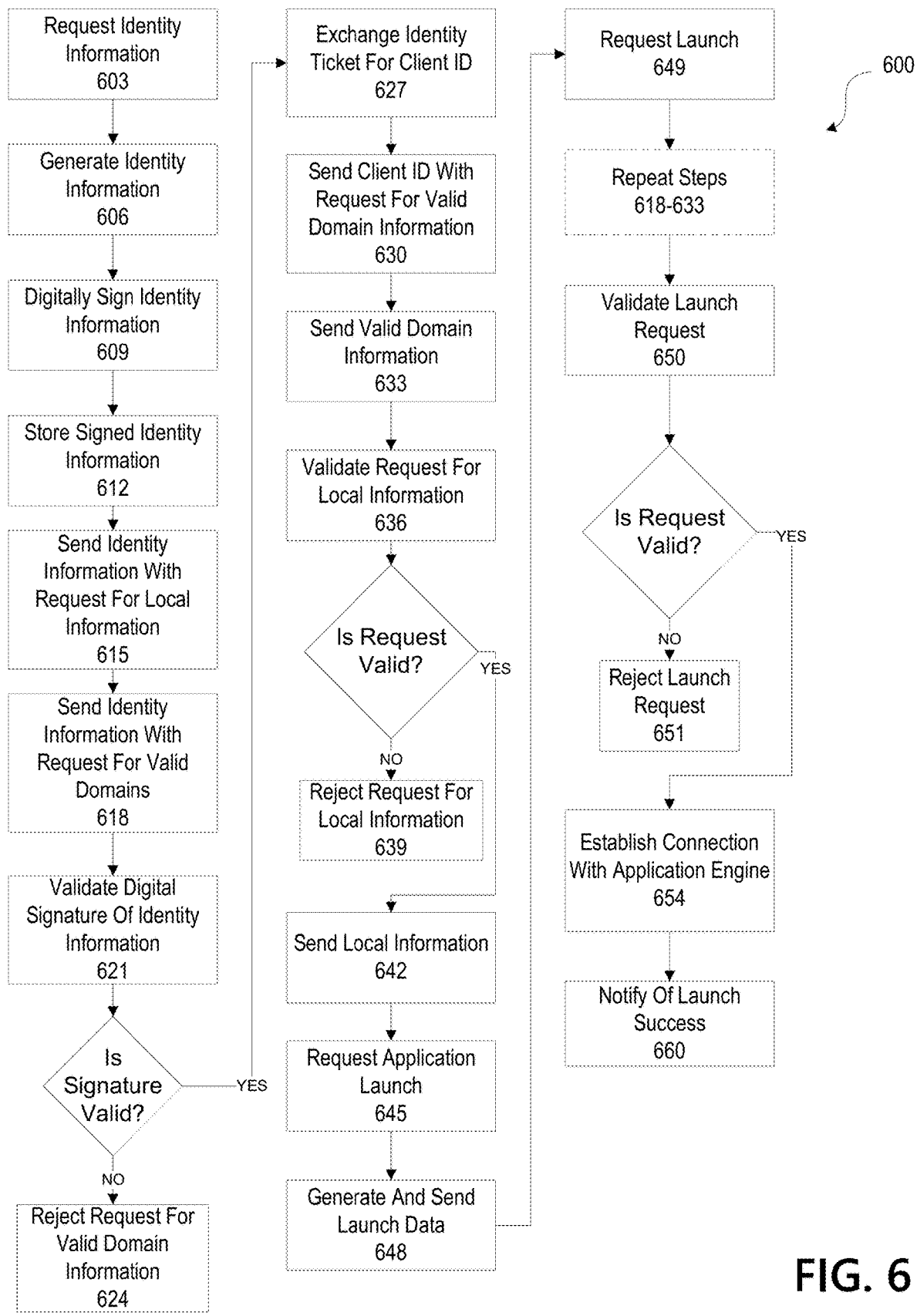
FIG. 6 depicts an illustrative method for secure cloud computing that may be used in accordance with one or more illustrative aspects described herein.

FIG. 6 depicts an illustrative method for securely invoking an application. The illustrative method may be performed by secure cloud system 500 or any other device/component described in FIGS. 1-5. Steps may repeat or be performed out of the order depicted in FIG. 6.

At step 603, a request for identity information may be received. For example, browser 530 (executing on user device 527) may send a request for identity information to store engine 505 and store engine 505 may receive the request. The request for identity information may occur after a user has logged into store engine 505 using browser 530. Store engine 505 may obtain a client ID when the user logs into store engine 505. For example, a user may use browser 530 to connect and login to store engine 505 by sending identity information such as the user's password and username to store engine 505. The client ID may identify the user and/or device 527. For example, the client identification information may include a username, an IP address or MAC address of a device of the user, or any other identifying information. Store engine 505 may send a request to ticketing engine 515 for identity information. Store engine 505 may include the client ID with the request when it is sent to ticketing engine 515.

At step 606, the identity information may be generated. For example, ticketing engine 515 may generate the identity information. The identity information may be an identity ticket. The identity ticket may be a one-time use ticket. The identity information may be a cookie. The identity information or identity ticket may identify the user, user device 527, an organization that the user belongs to, a group of users, and/or browser 530. The identity information may be generated based on the client ID received from store engine 505. For example, the identity information may be generated using a function that takes the client ID as input. Alternatively, the identity information may be unrelated to the client ID and may not directly identify a user or user device. For example, ticketing engine 515 may only know that the identity information corresponds to a particular user or user device after linking the identity information with the client ID. The identity information may allow other devices or engines to determine valid domains for a user of browser 530.

Ticketing engine 515 may store the client ID for later use. Ticketing engine 515 may link the client ID with the generated identity information. For example, ticketing engine 515 may store the client ID and generated identity information in a data structure that allows it to determine which client ID belongs with which identity information (e.g., a map, dictionary, etc.). Linking the client ID with the identity information may allow ticketing engine 515 to determine what client ID corresponds to the identity information. Ticketing engine 515 may send the generated identity information to store engine 505.

At step 609, the identity information may be signed. For example, store engine 505 may digitally sign the identity information with store engine's private key. Another engine or device may use the signature to verify the source of the identity information. Alternatively/additionally, one or more of trust engine 510, ticketing engine 515, configuration engine 520, and application engine 525 may digitally sign the identity information.

At step 612, the identity information may be stored. For example, store engine 505 may send the signed identity information to browser 530 and browser 530 may store the identity information for future use. For example, browser 530 may store the identity information in local storage and may send it as part of a request to local engine 535. At step 615, the identity information may be sent with a request for local information. For example, browser 530 may send the identity information and a request for local information to local engine 535. The request may contain information such as the time of request, the type of browser used to make request, any information that may be contained in HTTP requests (e.g., method, request-URI, request header fields, etc.), and/or information indicating where the request is originating from (e.g., an origin header that may contain a domain name).

Local information may include any information about software or hardware contained in user device 527. For example, local information may include software version information (e.g., version of local engine 535), whether local engine 535 is running in a virtual environment (e.g., virtual desktop), whether user device 527 is domain-joined, whether a user of user device 527 has administrator privileges, information indicating software that is installed on user device 527, and the like. The local information may be used to determine what remote resources can be used by device 527 or a user of device 527.

Browser 530 may send the identity information to local engine 535 using any protocol such as Hyper Text Transfer Protocol (HTTP), HyperText Transfer Protocol Secure (HTTPS), or the like.

At step 618, the identity information may be sent with a request for valid domain information. For example, local engine 535 may send a request for valid domain information to trust engine 510. The request may include the identity information that local engine 535 received from browser 530.

At step 621, the digital signature of the identity information may be validated. For example, trust engine 510 may determine whether the identity information has been signed by store engine 505 and/or any other engine within cloud engines 501. Trust engine 510 may use the public key of an engine (e.g., store engine 505) to determine whether the identity information was signed using a private key of the engine. The public/private key pair may be generated and exchanged using any cryptographic algorithm(s) such as Diffie-Hellman key exchange, RSA, etc.

If the signature on the identity information is not valid then the method may proceed to step 624. At step 624, the request for valid domain information may be denied. For example, local engine 535 may deny the request received from browser 530. Local engine 535 may send a notification to browser 530 that contains error messages or other information indicating that the request for local information was denied because the identity information was not validated. The notification may be displayed to a user of user device 527.

If the signature on the identity information is valid then the method may proceed to step 627. At step 627, the identity information may be exchanged for the client ID. For example, trust engine 510 may send the identity information to ticketing engine 515. In return, ticketing engine 515 may send the client ID that corresponds to the identity information to trust engine 510.

At step 630, a request for valid domain information may be sent. The request may include the client ID. For example, trust engine 510 may send the client ID with a request for valid domain information to configuration engine 520. Using the client ID, configuration engine 520 may determine valid domain information that corresponds to a user of browser 530. Valid domain information may include domain names that are trusted by a user, user device 527, or an organization that the user or user device 527 belong to. Valid domain information may include other information relevant to validating a request for local information. For example, valid domain information may include permissible browsers or browser types, permissible times for requests, etc. At step 633, the valid domain information may be sent to local engine 535. For example, configuration engine 520 may send the valid domain information to trust engine 510, and trust engine 510 may send the valid domain information to local engine 535. Alternatively, configuration engine 520 may send directly to local engine 535. Local engine 535 may store the valid domain information so that it need not make requests for valid domain information or contact trust engine 510 for every detection/launch request.

At step 636, the request for local information may be validated. For example, local engine 535 may validate the request for local information that was sent by browser 530. Local engine 535 may compare information contained in the request with information contained in the valid domain information. For example, local engine 535 may compare a domain name contained in an origin header in the request with domain names contained in the valid domain information. If the domain name in the origin header matches a domain name in the valid domain information then local engine 535 may determine that the request for local information is valid. Additionally/alternatively, local engine 535 may compare the browser type, time of request, and/or other information with the valid domain information to determine whether the request is valid.

If the request is not valid, then the method may proceed to step 639. At step 639, the request for local information may be rejected. For example, local engine 535 may reject the request from browser 530. Local engine 535 may send a notification to browser 530 indicating that the request for local information was denied because the identity information was not valid. The notification may be displayed to a user of user device 527.

If the request is valid, then the method may proceed to step 642. At step 642, local information may be sent. For example, local engine 535 may send local information to browser 530. Local engine 535 may send local information using any protocol such as Hyper Text Transfer Protocol (HTTP), HyperText Transfer Protocol Secure (HTTPS), or any other protocol including protocols mentioned above in step 615.

At step 645, a request for an application launch may be made. For example, browser 530 may send a request for an application launch to store engine 505. The request may indicate an application that a user would like to use. At step 648, launch data may be generated and sent. For example, store engine 505 may generate and send launch data to browser 530. Launch data may include a server for browser 530 to connect to (e.g., application engine 525), the application to launch, the type of application to launch, information needed to generate one or more user interfaces for an application, information needed to establish a connection with a remote server that provides the application (e.g., a single sign-on ticket), the version of the application to be launched, the name of application, window size for the application, color depth of the application etc. The launch data may include a uniform resource locator (URL) of a remote resource that local engine 535 can use to launch an application. The launch data may include a request to launch an application.

At step 649, a launch may be requested. For example, browser 530 may send the launch data to local engine 535 as part of a request to launch an application. The request may be an HTTP or HTTPS request that is sent to local engine 535. For example, local engine 535 may be running a HTTP web server that is configured to receive requests from other applications (e.g., browser 530) running on user device 527. The request may use a POST method to send the launch data to local engine 535. The launch request may contain any data that is described with respect to the request for local information in step 615 above. The identity information may be included with the launch request when it is sent to local engine 535. After receiving the launch data, the method may optionally repeat steps 618 through 633 to enable local engine 535 to obtain valid domain information. Alternatively, local engine 535 may use the valid domain information that it stored as discussed with step 633.

At step 650 the launch request may be validated. For example, local engine 535 may validate the launch request that was sent by browser 530. To validate the launch request, local engine 535 may compare information contained in the launch data with information contained in the valid domain information. For example, local engine 535 may compare a domain name contained in an origin header in the launch request with domain names contained in the valid domain information. If the domain name in the origin header matches a domain name in the valid domain information then local engine 535 may determine that the request for local information is valid. Additionally/alternatively, local engine 535 may compare the browser type, and/or other information with the valid domain information to determine whether the launch data is valid.

If the launch request is not valid then the method may proceed to step 651. At step 651, the launch request may be rejected. For example, local engine 535 may reject the launch request from browser 530. Local engine 535 may send a notification to browser 530 indicating that the request for local information was denied because the identity information was not valid. The notification may be displayed to a user of user device 527. Data regarding the failed launch may also be sent to cloud engines 501 (e.g., trust engine 510). For example, a notification that the launch request has been rejected may be sent to trust engine 510.

If the launch request is valid, then the method may proceed to step 654. At step 654, a connection may be established with application engine 525. For example, local engine 535, may establish a connection with application engine 525. The connection may allow application engine 525 and local engine 535 to exchange data and provide access to an application for user device 527. For example, application engine 525 may provide access to a virtual application, a virtual desktop, a virtual machine, or any other type of application. At step 660, local engine 535 may notify browser 530 that the application launch was a success. For example, local engine 535 may send a message using HTTP or HTTPS to browser 530 containing the notification. Browser 530 may allow a user of user device 527 to use the launched application.

Figure 7A:
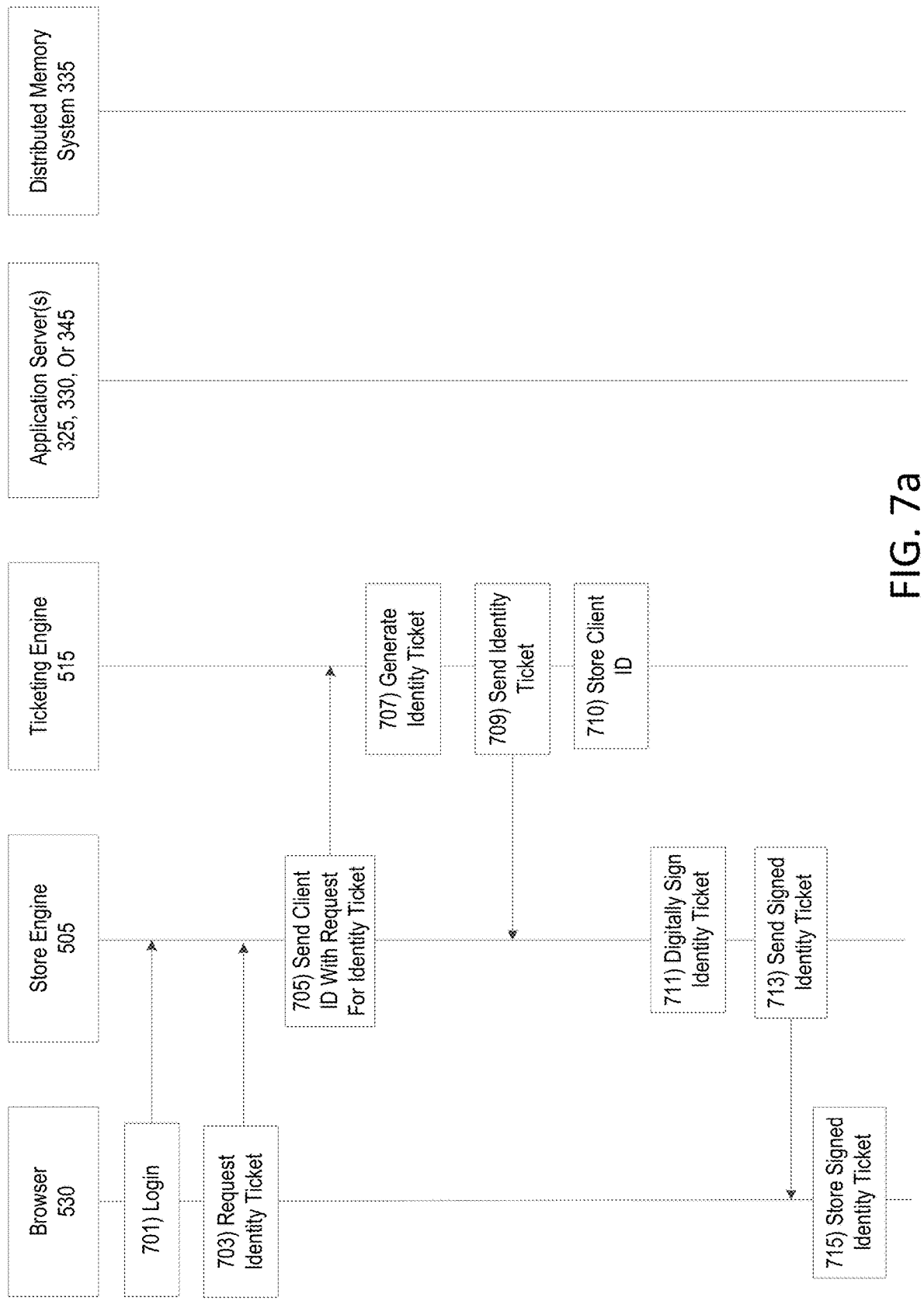
FIGS. 7a-7c depict an additional illustrative method for secure cloud computing that may be used in accordance with one or more illustrative aspects described herein.
Figure 7B:
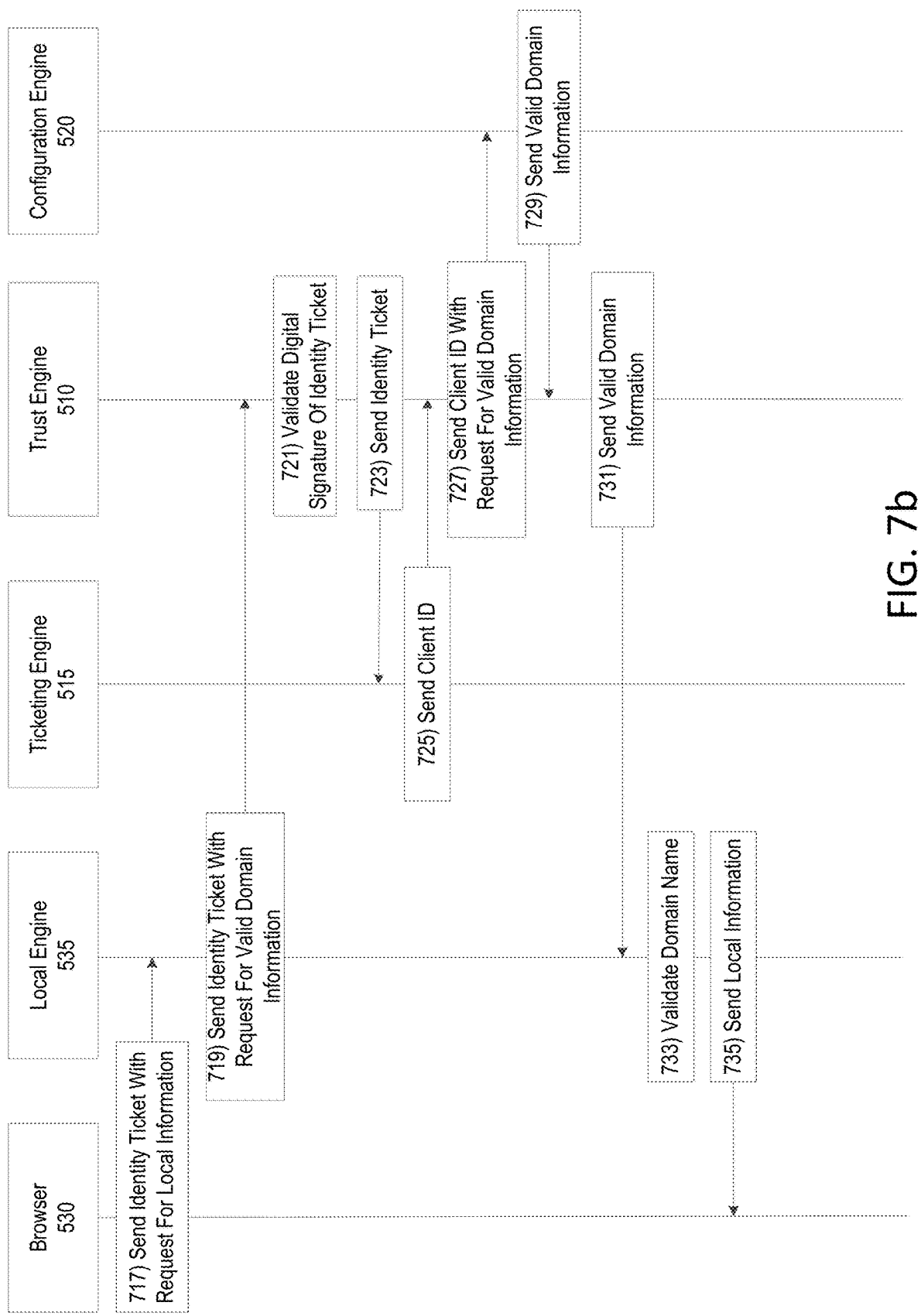
Figure 7C:
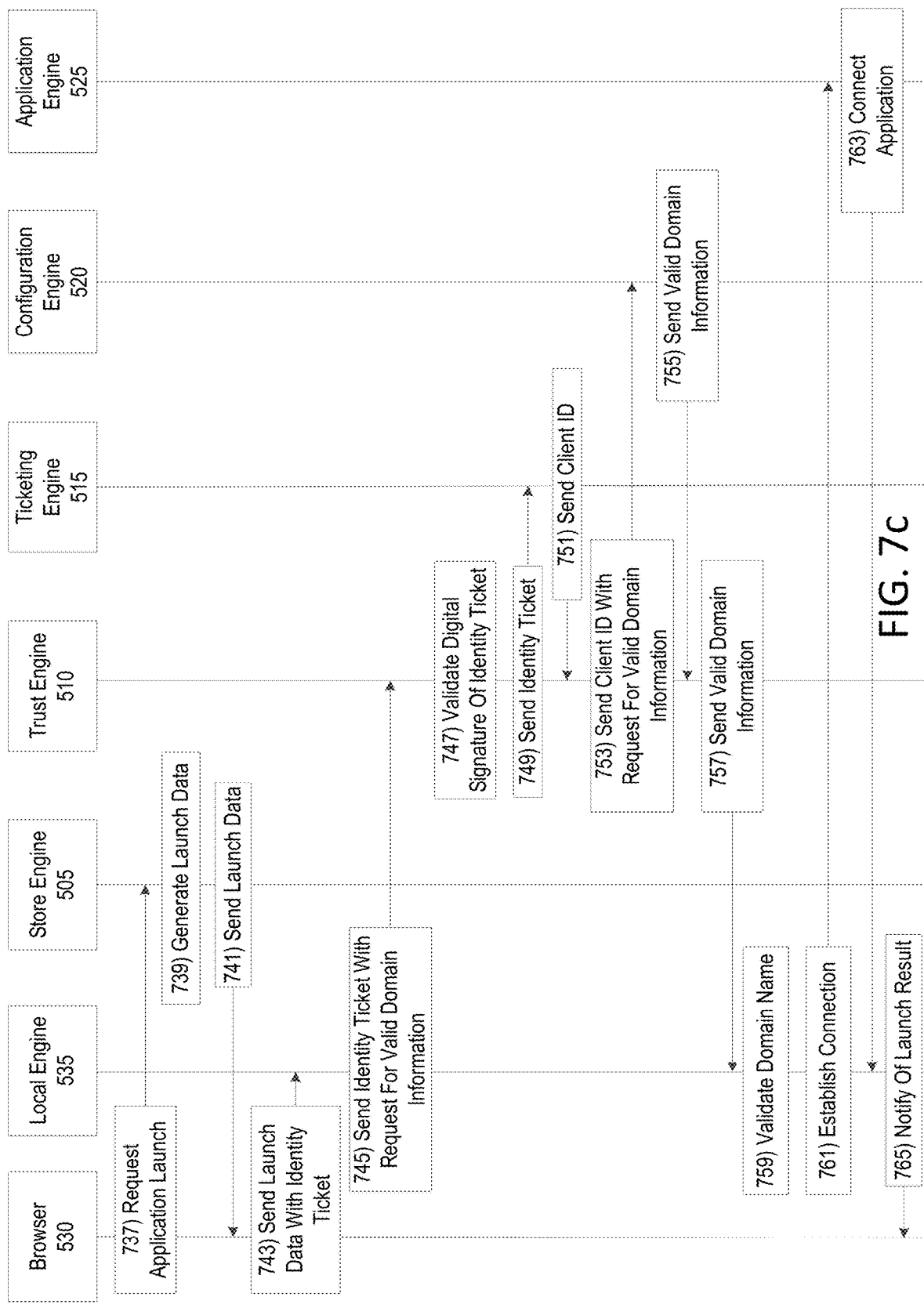

FIGS. 7a-7c depicts an additional illustrative method for securely invoking an application. The illustrative method may be performed by secure cloud system 500 or any other device/component described in FIGS. 1-5. One or more of the operations described in connection with FIGS. 7a-7c may also or alternatively be performed by one or more other computing devices. Steps may repeat or be performed out of the order depicted in FIGS. 7a-7c.

Referring to FIG. 7a, at step 701, browser 530 may login to store engine 505. At step 703, browser 530 may request an identity ticket from store engine 505. At step 705, store engine 505 may send a request for an identity ticket to ticketing engine 515. The request may include a client identification corresponding to browser 530 and/or a user of browser 530. At step 707, ticketing engine 515 may generate an identity ticket. At step 709, ticketing engine 515 may send the identity ticket to store engine 505. At step 710, ticketing engine 515 may store the client ID received from browser 530.

At step 711, store engine 505 may digitally sign the identity ticket. At step 713, store engine 505 may send the signed identity ticket to browser 530. At step 715, browser 530 may store the signed identity ticket.

Referring to FIG. 7b, at step 717, browser 530 may send a request for local information to local engine 535. The request may include the identity ticket received in step 713. The request may include a domain name. For example, the domain name may be included in an origin header of the request. Browser 530 may prevent the origin header from being spoofed. At step 719, local engine 535 may send a request for valid domain information to trust engine 510. The request may contain the identity ticket received from browser 530.

At step 721, trust engine 510 may validate the digital signature of the identity ticket. For example trust engine 510 may verify that the identity ticket has been signed by store engine 505. At step 723, trust engine 510 may send the identity ticket to ticketing engine 515. At step 725, ticketing engine 515 may send the client ID to trust engine 510. The client ID may be linked or otherwise associated with the identity ticket received in step 723.

At step 727, trust engine may send a request for valid domain information to configuration engine 520. The request may contain the client ID that trust engine 510 obtained in step 725. At step 729, configuration engine 520 may send valid domain information to trust engine 510. The valid domain information may correspond to the client ID that the configuration engine 520 received in step 727.

At step 731, trust engine 510 may send the valid domain information to local engine 535. At step 733, local engine 535 may validate a domain name received from browser 530. For example, local engine 535 may compare the domain name received from browser 530 with the valid domain information. If the domain name received from browser 530 is valid, then local engine 535 may send the local information to browser 530.

Referring to FIG. 7c, at step 737, browser may send a request for an application launch to store engine 505. At step 739, store engine 505 may generate launch data based on the request from browser 530. At step 741, store engine 505 may send the launch data to browser 530.

At step 743, browser 530 may send the launch data to local engine 535. Browser 530 may send the identity ticket with the launch data to local engine 535. Browser 530 may send a domain name of a web application that is running in browser 530 to local engine 535. At step 745, local engine 535 may send a request for valid domain information. The request may include the identity ticket that was sent from browser 530 in step 743. At step 747, trust engine 510 may validate a digital signature of the identity ticket. For example, trust engine may determine whether the identity ticket was signed by a private key belonging to store engine 505. At step 749, trust engine 510 may send the identity ticket to ticketing engine 515. At step 751, ticketing engine 515 may send the client ID to trust engine 510. The client ID may be sent in response to receiving the identity ticket that matches the client ID.

At step 753, trust engine 510 may send a request for valid domain information to configuration engine 520. The request may contain the client ID received in step 751. At step 755, configuration engine 520 may send valid domain information to trust engine 510. The valid domain information may indicate domains that a client device associated with the client ID is allowed to access. The valid domain information may indicate domains that are trusted by a client device associated with the client ID.

At step 757, trust engine 510 may send the valid domain information to local engine 535. At step 759, local engine 535 may validate the domain name received from browser 530. At step 761, if the domain name received from browser 530 is valid, then the local engine may establish a connection with application engine 525. At step 763, application engine may connect an application to local engine 535. At step 765, local engine 535 may notify browser 530 that the application launch was successful.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   sending, by a server, identification information to a web browser executing on a client device, the identification information being associated with the client device;
   receiving, by the server, a request for valid domain information from a first application executing on the client device, wherein the request comprises the identification information;
   sending, by the server, the valid domain information to the first application based on a determination that the identification information is signed by a key pair and is valid; and
   establishing, based on a determination that a domain name associated with the web browser is valid, a connection with a second application executing on a remote device, wherein the determination is made using the valid domain information.

2. The method of claim 1, wherein the identification information is generated from a user profile linked to an actively logged in account on the client device.

3. The method of claim 1, further comprising:
   sending, to the first application and based on a request to launch the second application, the valid domain information, wherein the request to launch the second application is received from the web browser.

4. The method of claim 3, further comprising:
   receiving, from the first application, a request to connect to the second application; and
   establishing a connection between the first application and the second application.

5. The method of claim 1, wherein the identification information comprises an identity ticket and wherein the identity ticket is linked to a user identification obtained from the web browser.

6. The method of claim 1, further comprising:
   signing the identification information with a private key, wherein the determination that the identification information is signed by a key pair and is valid comprises validating, using a public key that is generated by the server and is paired with the private key, that the identification information is signed by the private key.

7. A system comprising:
   a server and a client device,
   wherein the client device comprises:
      one or more processors and memory, configured to:
         send, by a web browser executing on the client device, a first request for local information to a first application executing on the client device; and
   wherein the server comprises:
      one or more processors and memory, configured to:
         receive, from the first application, a second request for valid domain information, wherein the second request comprises identification information corresponding to the web browser; and
         send, to the first application, and based on a determination that the identification information is signed by a key pair and is valid, the valid domain information.

8. The system of claim 7, wherein the identification information is generated from a user profile linked to an actively logged in account on the client device.

9. The system of claim 7, further comprising:
   signing the identification information with a private key, wherein the private key corresponds to a device that is separate from the client device.

10. The system of claim 7, wherein the one or more processors and memory are further configured to:
    send, to the first application and based on a request to launch a second application, the valid domain information, wherein the request to launch the second application is received from the web browser.

11. The system of claim 10, wherein the one or more processors and memory are further configured to:
    receive, from the first application, a request to connect to the second application; and
    establish a connection between the first application and the second application.

12. The system of claim 7, wherein the identification information comprises an identity ticket and wherein the identity ticket is linked to a user identification obtained from the web browser.

13. The system of claim 9, wherein the determination that the identification information is signed by a key pair and is valid comprises validating, using a public key that is generated by the server and is paired with the private key, that the identification information is signed by the private key.

14. The system of claim 8, wherein the first request is sent using Hypertext Transfer Protocol, and wherein the first request comprises an origin header indicating a domain name corresponding to a source of the first request.

15. An apparatus, comprising one or more processors and memory, configured to:
   receive, by a web browser executing on the apparatus, identification information from a first server, wherein the identification information is associated with the apparatus;
   send, from the web browser, a first request to a first application executing on the apparatus, the first request comprising the identification information and a domain name;
   send, from the first application and to the first server, a second request for valid domain information, wherein the second request comprises the identification information;
   receive, by the first application, and based on a determination that the identification information is signed by a key pair and is valid, the valid domain information; and
   based on a determination that the domain name is valid, establish a connection with a second server, wherein the determination is made using the valid domain information.

16. The apparatus of claim 15, wherein the identification information comprises an identity ticket and wherein the identity ticket is linked to a user identification obtained from the web browser.

17. The apparatus of claim 15, wherein the identification information is generated from a user profile linked to an actively logged in account on the client device.

18. The apparatus of claim 15, wherein the apparatus is further configured to:
   send, by the web browser and to the first server, a request to launch a remote application; and
   validate, by the first application and based on the valid domain information, the request to launch a remote application.

19. The apparatus of claim 15, wherein the first request is sent using Hypertext Transfer Protocol, and wherein the first request comprises an origin header indicating a domain name corresponding to a source of the first request.

20. The apparatus of claim 15, wherein the determination that the identification information is signed by a key pair and is valid comprises validating, using a public key that is generated by the first server and is paired with a private key, that the identification information is signed by the private key.

* * * * *